No. 887,110. PATENTED MAY 12, 1908.
G. A. MILLER.
HAME FASTENER.
APPLICATION FILED SEPT. 10, 1906.
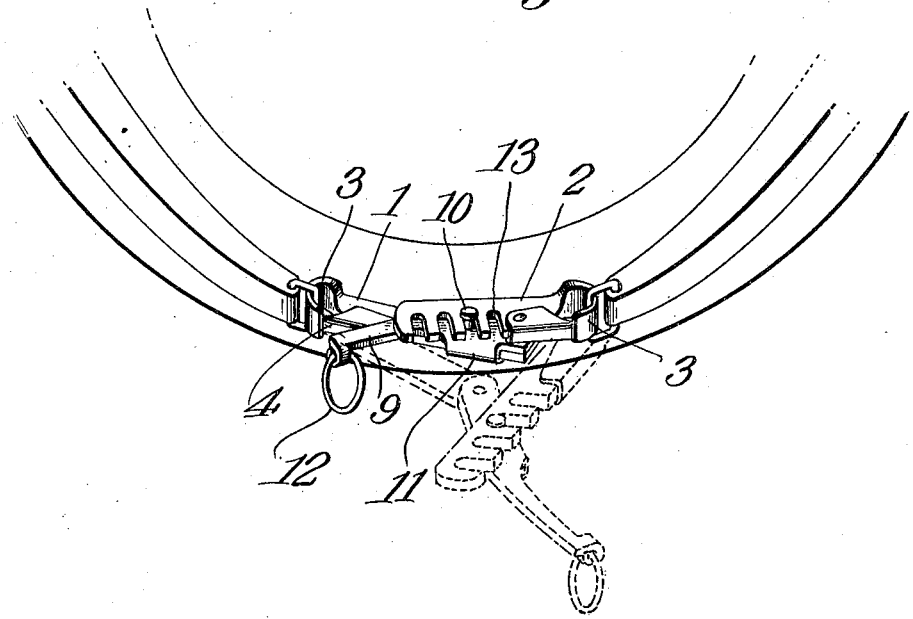
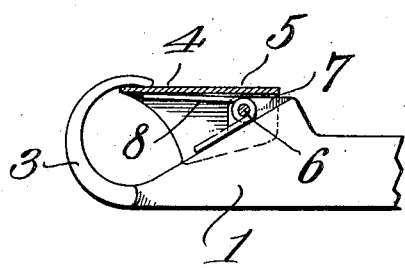
WITNESSES:
George A. Miller,
INVENTOR.
By C. A. Snow & Co.
ATTORNEYS ic
UNITED STATES PATENT OFFICE.

GEORGE A. MILLER, OF LOUISVILLE, KENTUCKY.

HAME-FASTENER.

No. 887,110.      Specification of Letters Patent.      Patented May 12, 1908.

Application filed September 10, 1906. Serial No. 334,000.

*To all whom it may concern:*

Be it known that I, GEORGE A. MILLER, a citizen of the United States, residing at Louisville, in the county of Jefferson and State of Kentucky, have invented a new and useful Hame-Fastener, of which the following is a specification.

This invention has relation to hame fasteners and it consists in the novel construction and arrangement of the parts as hereinafter shown and described.

The object of the invention is to provide a hame fastener which may be easily, readily and positively applied to the lower ends of the hames, the said fastener comprising members having snap hooks of special construction which engage the eyes of the hames. One of said members is provided with a series of inclined recesses located in its lower edge, while the other member is provided with a lever of peculiar configuration, said lever having upon its outer side a stud adapted to enter one of the recesses of the aforesaid member. The said lever is fulcrumed at its ends to the member to which it is attached, and one end of the lever is inclined at an angle to its other end. The lower edge of the lever is provided with a lug which is adapted to engage the underside of the member to which the said lever is attached and thus the movement of the said lever upon its fulcrum is limited.

In the accompanying drawings:—Figure 1 is a side elevation of the fastener applied to the hames, and Fig. 2 is a side elevation, partly in section, of one of the snap hooks.

The hame fastener comprises the members 1 and 2, each of said members being provided at its end with a hook 3 which is adapted to enter an eye 4 at the lower end of the hame. Each said member is also provided with a keeper 4. The keeper consists of a strip of metal 5 which is bent back at its longitudinal axis, forming parallel sides which straddle the respective member to which it is attached. The pivot 6 secures the keeper to the member. The said pivot passes transversely through the lug 7, the transverse thickness of which is less than the transverse thickness of the member. As the sides of the strip 5 lie against the sides of the member, space is left at the side of the lug 7 and the side of the strip 5. Said space also occurs at the pivot 6. In the space thus provided, the spring 8 is located, said spring at its intermediate portion passing around the pivot 6 and bearing at one end against the keeper 4 and at its other end against the member. The tension of said spring is such as to have a tendency to maintain its ends spread, and consequently the end of the keeper 4 will be retained normally against the hook 3. Thus a form of snap hook is provided which is especially adapted to be used upon the members of hame fasteners. It is positive and durable, and the keeper is so formed and positioned that it cannot be twisted to one side when subjected to lateral strain.

The lever 9 is fulcrumed at its end to the inner end of the member 1. The ends of the said lever are pitched at an angle to each other. The stud 10 is located upon the outer side of the said lever and is positioned substantially upon the longitudinal axis of both ends of the lever. The lug 11 is located at the lower edge of the lever 9 and is adapted to engage the lower edge of the member 1 and limit the upward movement of the free end of the said lever. The lower edge of the lug 11 clasps the member 1 and by this means the member 1 and lever 9 are held firmly together at a point opposite the stud 10, at which point stress is applied. This arrangement transmits stress directly from the member 1 to the member 2 in the most direct and substantial manner. The free end of the lever 9 is provided with a ring 12. The member 2 is provided in its under edge with a series of inclined recesses 13.

To apply the hame fastener, the hooks 3 of the members 1 and 2 are snapped into the eyes at the lower ends of the hame. The free end of the lever 9 is swung away from the member 1 and the stud 10 is inserted in one of the recesses 13 of the member 2. The free end of the lever 9 is then swung toward the member 1 and thus the said members 1 and 2 are drawn together. As the said members when drawn together are pitched at a slight angle with relation to each other, the pull exerted upon the stud 10 is in a lateral direction with relation to the member 1 and, as the lug 11 limits the upward movement of the lever 9 with relation to the member, the parts will remain in the position above indicated without other locking or securing devices. To disengage the parts, the lever 9 is swung down upon its fulcrum. The ring 12 is used as a handle for manipulating the lever.

Having described my invention, what I claim as new and desire to secure by Letters Patent is:—

A hame fastener comprising members having hooks engaging the hames, one of said members having in its edge a series of recesses, a lever fulcrumed to the other member and lying between the members, a headed stud located upon the lever at a point intermediate of the ends thereof, said lever having at its edge and at a point opposite the stud a lug adapted to receive and clasp the edge of the member to which the lever is fulcrumed, the shank of said stud being adapted to enter one of the recesses of the member unattached to the lever.

In testimony that I claim the foregoing as my own, I have hereto affixed my signature in the presence of two witnesses.

GEORGE A. MILLER.

Witnesses:
R. B. MAYNARD,
NEILL BEGHTOL.